(12) United States Patent
Gopalan (10) Patent No.: US 8,510,347 B2
(45) Date of Patent: Aug. 13, 2013

(54) METHOD AND SYSTEM FOR DEVELOPING A META-MODEL SCHEMA

(75) Inventor: Kishore Gopalan, Karnataka (IN)

(73) Assignee: Infosys Limited (IN)

( * ) Notice: Subject to any disclaimer, the term of this patent is extended or adjusted under 35 U.S.C. 154(b) by 247 days.

(21) Appl. No.: 12/634,765

(22) Filed: Dec. 10, 2009

(65) Prior Publication Data

US 2010/0153473 A1 Jun. 17, 2010

(30) Foreign Application Priority Data

Dec. 11, 2008 (IN) .......................... 3106/CHE/2008

(51) Int. Cl.
*G06F 7/00* (2006.01)
*G06F 17/30* (2006.01)

(52) U.S. Cl.
USPC ........................................................ 707/803

(58) Field of Classification Search
USPC .................................. 707/810, 803, 999.102
See application file for complete search history.

(56) References Cited

U.S. PATENT DOCUMENTS

2007/0250826 A1* 10/2007 O'Brien ........................ 717/162
2010/0023920 A1* 1/2010 Chaar et al. ................... 717/102

* cited by examiner

*Primary Examiner* — Alexey Shmatov
(74) *Attorney, Agent, or Firm* — Cantor Colburn LLP (57) ABSTRACT

The present invention provides a method, system and computer program product for developing a meta-model schema on the basis of one or more requirements associated with an enterprise process. The method includes defining various sets of meta-models based on the requirements and a predefined ontology. Each set of meta-models includes at least one meta-model that has been defined based on at least one other meta-model of the set of meta-models. Thereafter, the sets of meta-models defined for the corresponding requirements are integrated to develop the meta-model schema.

27 Claims, 7 Drawing Sheets

METHOD AND SYSTEM FOR DEVELOPING A META-MODEL SCHEMA

BACKGROUND

The present invention relates to the field of Domain-Specific Modeling (DSM). More specifically, the present invention relates to developing a meta-model schema to generate application software.

In the field of software engineering, DSM is a methodology used for developing application software. Various domain-specific models are defined for developing the application software. These domain-specific models are created from Domain-Specific Languages (DSLs), which are defined on the basis of various meta-models. Further, the domain-specific models are used for automatically generating software artifacts. Software artifacts are resources that are used to build new application software. Examples of software artifacts include source codes, configuration files, software specification files, architecture and design models, test data, test scripts, process models, project plans, and so forth. The automatic generation of software artifacts helps in standardizing the process of generating application software and enables quick generation of application software.

The domain-specific models represent an enterprise process. An enterprise process is a collection of various tasks that are performed to accomplish a goal. Examples of enterprise processes may include a process for managing orders in a restaurant, a process for validating credit card payments, and so forth. However, the domain-specific models do not provide a formalized representation of the enterprise process. Moreover, the domain specific models do not distinctly differentiate between various tasks of the enterprise processes. Therefore, it results in lack of efficient inter-relationship between various domain-specific models. The lack of differentiation between the various tasks of the enterprise process reduces the traceability of information between the domain-specific models and the requirements for which the domain-specific models are created. The reduced traceability also limits mapping of the requirements to the generated software artifacts.

In light of the discussion above, there is need for a method, system and computer program product for generating domain-specific models that distinctly differentiate between various tasks of an enterprise process. Further, such a method, system and computer program product should enable efficient traceability of information between the generated software artifacts and the requirements for which they have been generated.

SUMMARY

An object of the invention is to enable the generation of software artifacts for various requirements associated with an enterprise process.

Another object of the invention is to enable the efficient traceability of information between the generated software artifacts and the requirements associated with the enterprise process.

To achieve the objectives mentioned above, the invention provides a method, system and computer program product for developing a meta-model schema for one or more requirements based on a predefined ontology. These requirements are associated with an enterprise process. The method includes defining one or more sets of meta-models based on the requirements and the predefined ontology. Each requirement corresponds to at least one set of meta-models. A set of meta-models includes at least one meta-model that has been defined based on at least one other meta-model of the set of meta-models. Thereafter, at least one set of meta-models is connected to at least one other set of meta-models to develop the meta-model schema. The sets are connected based on the interdependency between the corresponding requirements. The meta-model schema is used to automatically generate software artifacts.

The present invention enables a user to represent the enterprise process through the meta-model schema. The requirements associated with the enterprise process are captured and are considered to develop various sets of meta-models. Further, these meta-models are defined based on a predefined ontology. Therefore, the meta-model schema developed based on the meta-models includes a representation of meta-models that are interlinked. Further, the meta-model schema provides a distinct and differentiated representation of the enterprise process. In addition, each set of meta-models corresponds to at least one requirement. This enables a user to determine which meta-model has been defined for which requirement. Since the meta-models are defined based on the requirements, the software artifacts generated from these meta-models correspond to the requirements. Therefore, each software artifact generated using the meta-model schema corresponds to a task of the enterprise process. The present invention also enables a user to calculate the completeness of the meta-model schema. Thus, the user can distinctly analyze the number of requirements that have been considered to build the meta-model schema.

BRIEF DESCRIPTION OF DRAWINGS

The various embodiments of the invention will hereinafter be described in conjunction with the appended drawings, provided to illustrate and not to limit the invention, wherein like designations denote like elements, and in which.

DETAILED DESCRIPTION OF DRAWINGS

The invention describes a method, system and computer program product for developing a meta-model schema for an enterprise process. The meta-model schema is developed for generating various Domain-Specific Languages (DSLs), which are used to generate various domain-specific models. These domain-specific models are used to generate various software artifacts. The software artifacts help in building the complete application software. Examples of software artifacts include source codes, configuration files, software specification files, architecture and design models, test data, test scripts, process models, project plans, and so forth. These software artifacts are generated to fulfill the requirements associated with the enterprise process. In various embodiments of the invention, the enterprise process represents a problem domain for which the application software needs to be generated.

Figure 1:
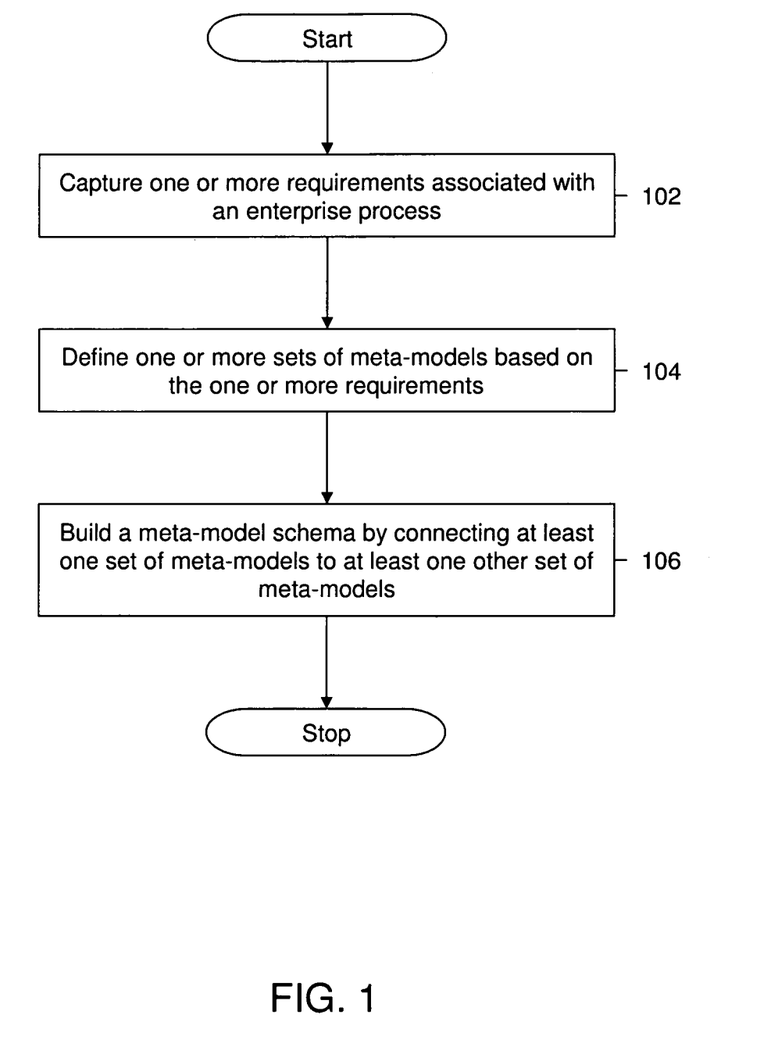
FIG. 1 illustrates a flowchart of a method for developing a meta-model schema, in accordance with an embodiment of the invention.

FIG. 1 illustrates a flowchart of a method for developing a meta-model schema, in accordance with an embodiment of the invention.

Various organizations develop application software for various enterprise processes. An enterprise process is a collection of various tasks that are performed to accomplish a goal. Examples of an enterprise process may include a process for managing orders in a restaurant, a process for validating credit card payments, and so forth. In various embodiments of the invention, the enterprise process is represented by a meta-model schema. The meta-model schema is a representation of various meta-models that define a set of concepts of the enterprise process. The meta-model schema includes the relationship between these meta-models. The process of development of the meta-model schema is described in detail below.

At 102, one or more requirements associated with the enterprise process are captured. The requirements include information, such as business requirements and system requirements, needed for developing the application software. The business requirements include various domain concepts, business processes, business rules, workflows, business methodologies relevant to the enterprise process, and so forth. For example, the business requirement for developing application software for a hotel management system may include business rules and methodologies of a meal ordering process, a room reservation system, an online payment system, and so forth. The business requirements are commonly referred to as business appreciation.

The system requirements include identification of all the components of an existing system, application context, data flow, system flow, quantifying the quality of components, and so forth. Referring to the example above, the system requirements may include service interface required for consumers to place meal orders, requirements for interacting with third parties such as banks for payments, and so forth. The system requirements are commonly referred to as system appreciation.

In various embodiment of the invention, the one or more requirements are captured by a user. The user may be a software developer, an engagement/relationship manager, and the like.

Figure 3:
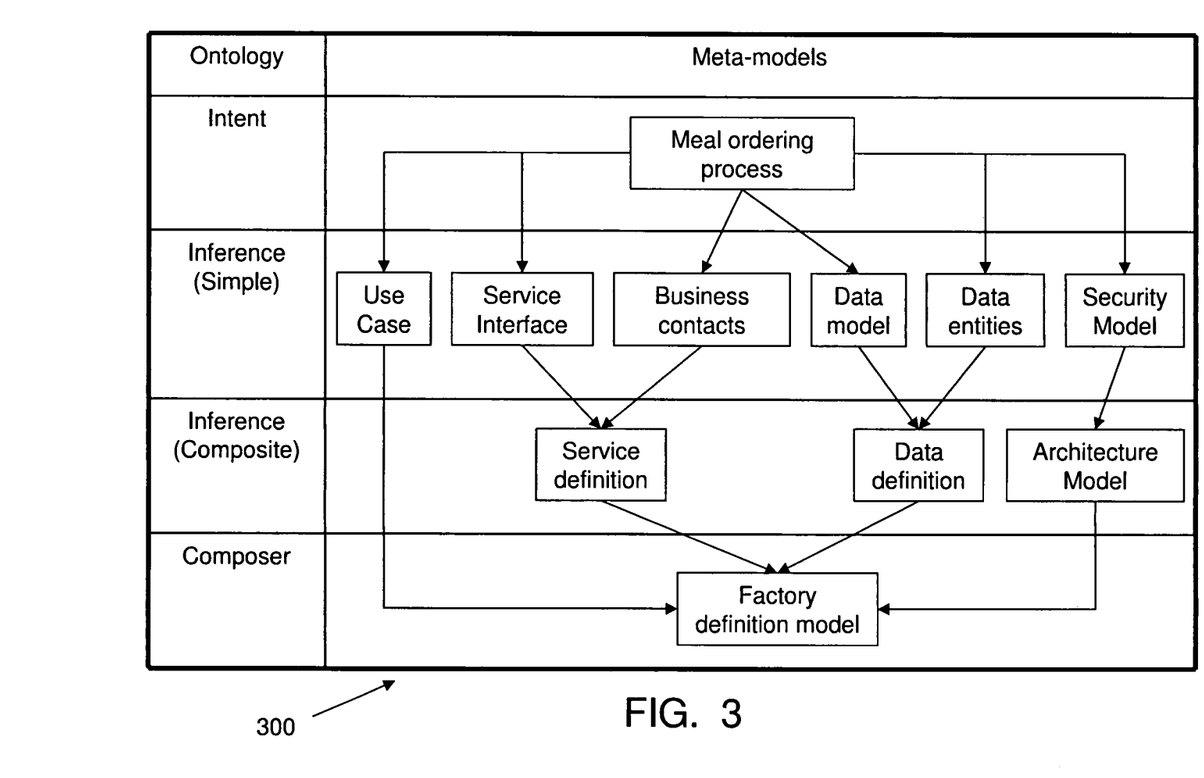
FIG. 3 illustrates a set of meta-models, in accordance with an exemplary embodiment of the invention.

At 104, one or more sets of meta-models are defined based on the one or more requirements captured for the enterprise process and a predefined ontology. For example, the set of meta-models defined for the requirements corresponding to a meal ordering process of a hotel management system may include meta-models defined for the requirements related to a service interface, service definitions, data entities, data models, data definition, security model, architecture model, and factory definition model, as depicted in FIG. 3. Further, each set of meta-models corresponds to at least one requirement. Each set of meta-models includes at least one meta-model that has been defined based on at least one other meta-model of the same set. For example, if a set of meta-models is defined for the requirements corresponding to a meal ordering process of a hotel management system, then a service definition meta-model may be defined based on a service interface meta-model and a business contracts meta-model. This has been depicted in FIG. 3. In various embodiments of the invention, the meta-models are defined by the user.

In various embodiments of the invention, the sets of meta-models are defined based on a predefined ontology. The predefined ontology defines a set of concepts for defining, representing, differentiating and inter-relating meta-models. The predefined ontology defines the set of concepts for defining various intent meta-models, inference meta-models, and composer meta-models for the enterprise process. The representation of the meta-models is used for defining and analyzing the enterprise process. Intent meta-models are based on intents defined based on the predefined ontology. The intents define the objectives that lead to a sequence of planned actions that need to be performed to achieve a desired result. Thereafter, inferences defined based on the predefined ontology are derived based on the intents to define the requirements for developing the application software. Inference meta-models are then built corresponding to the derived inferences. Further, the intents and inferences include various requirements for generating software artifacts and to provide a representation of the enterprise process. Subsequently, composers defined based on the predefined ontology connect various intents and inferences to generate software artifacts. In various embodiments of the invention, a composer meta-model is built for connecting various intent meta-models and inference meta-models. In various embodiments of the invention, the intents, inferences and composers represent the intent, inference and composer meta-models that the user has modeled.

Figure 2A:
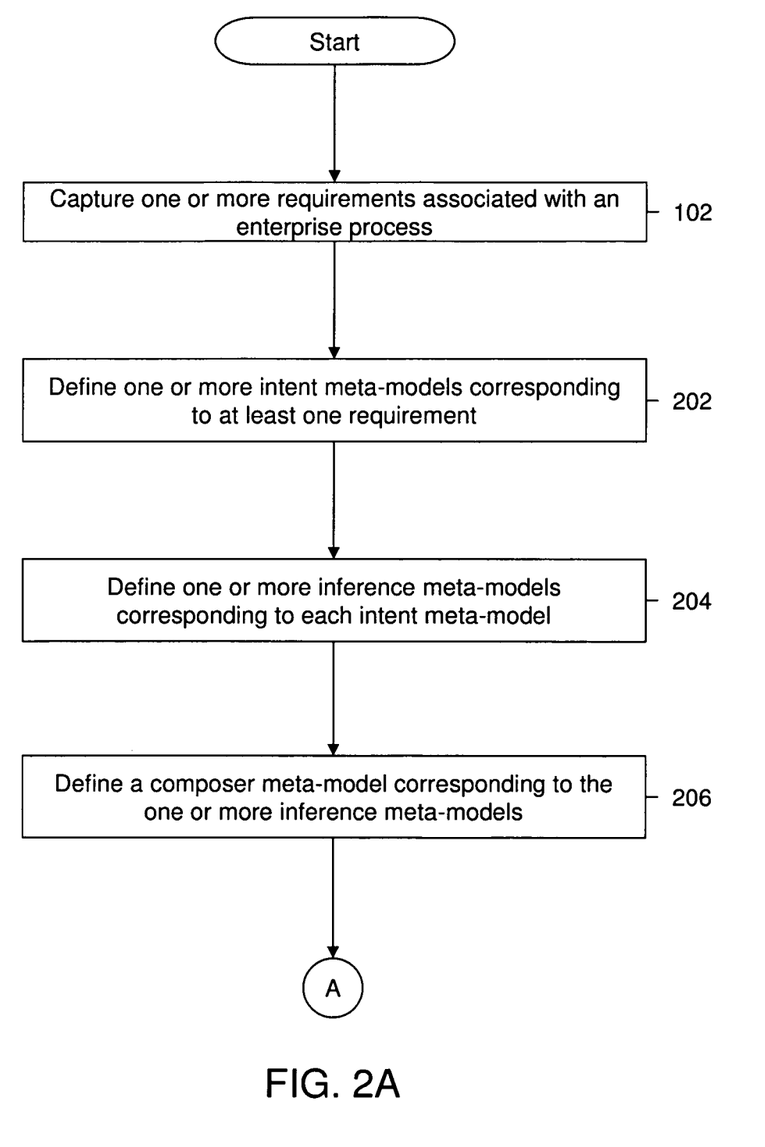
FIGS. 2A and 2B illustrate a flowchart of the method for developing the meta-model schema, in accordance with another embodiment of the invention.

The sets of meta-models are defined for various requirements. Each set of meta-model corresponds to a requirement. Further, corresponding to the requirement intent, inference and composer meta-models are defined. This helps in differentiating between the meta-models and inter-relating them based on their definition. In various embodiment of the invention, the predefined ontology is defined by the user. In various embodiments of the invention, the connections of the meta-models are made by the user. Building various meta-models has been described in detail in conjunction with FIG. 2.

At 106, a meta-model schema is built. The meta-model schema includes the sets of meta-models that are defined based on the requirements. The meta-model schema is developed by connecting at least one set of meta-models to at least one other set of meta-models. For example, if a meta-model schema built for a hotel management system includes sets of meta-models defined for online reservation and meal ordering, then the meta-model schema may include the sets of meta-models defined for online reservation connected to the sets of meta-models defined for meal ordering. In various embodiments of the invention, the meta-model schema is defined by the user.

Figure 2B:
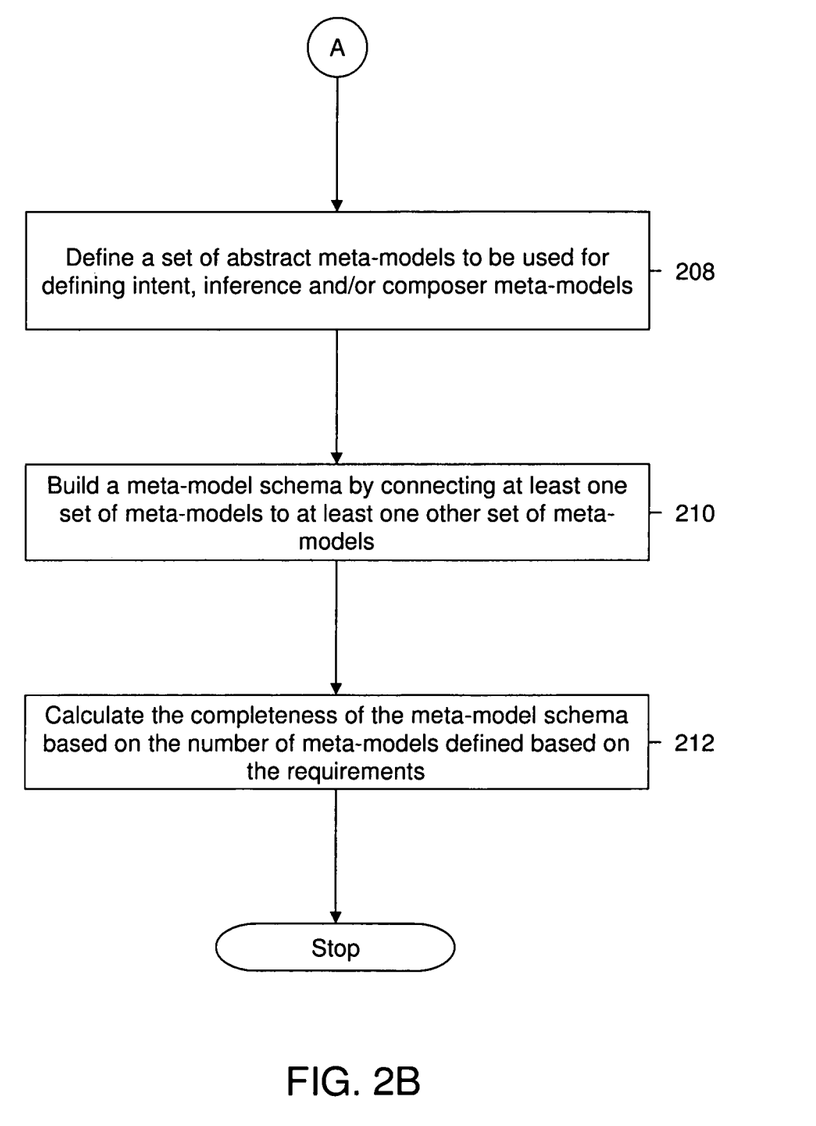

FIGS. 2A and 2B illustrate a flowchart of the method for developing the meta-model schema, in accordance with another embodiment of the invention. To describe the method, references will be made to FIG. 1 and its description, although it should be understood that the method can be practiced with any other suitable embodiment of the invention, and can include fewer or greater number of steps than stated in FIG. 1.

At 102, one or more requirements that are associated with the enterprise process are captured. These requirements include, but are not limited to, business and system requirements for developing application software for the enterprise process. The requirements and the capturing of the requirements have been described in detail in conjunction with FIG. 1.

In an embodiment of the invention, the requirements are further classified into theoretical knowledge and practical knowledge. In other words, each business requirement and system requirement is classified as theoretical knowledge or practical knowledge. Theoretical knowledge provides concepts that define the enterprise process. For example, if the enterprise process is hotel management, then theoretical knowledge may include concepts related to business rules in hotel management, management of customers, reservation of rooms in hotels, and so forth. Practical knowledge provides information related to actions performed based on the theoretical knowledge. For example, business rules and business processes associated with the reservation of rooms in a hotel may be used to generate various use cases and data models for the reservation of rooms.

In an embodiment of the invention, the requirements that have been captured for the enterprise process are quantifiable. In other words, each requirement can be represented in the form of a quantifiable representation. For example, if the business requirements corresponding to the enterprise process of hotel management include rules for providing reservation to customers, then these requirements may include the number of rooms available for reservation, the amount required for reservation, and so forth. The requirements are quantified as numbers, alphabets, symbols, and so forth. However, some of the requirements related to the enterprise process may not be quantifiable. This can be due to lack of availability of information related to the requirement.

In an embodiment of the invention, the requirements are quantifiable only in accordance with a quantifiable representation of knowledge that is provided by knowledge representing mechanisms such as semantic networks. For example, in a hotel management system, if the requirement is pricing of AC rooms, then it may be determined based on basic prices, taxes, discounts and so forth. This determination is based on known figures and hence can be used for defining a meta-model which then can be used to generate a software artifact, such as, a software artifact for online booking of AC rooms. In an embodiment of the invention, a requirement may not be quantifiable. In the above example, the price of the AC room may involve luxury tax, which makes the determination of the price based on an incomplete figure. Therefore, the requirement can not be used to define a meta-model and thence cannot be used to generate a software artifact. A requirement that is quantifiable is commonly referred to as a knowledge point.

In various embodiments of the invention, each set of meta-models includes an intent meta-model, one or more inference meta-models corresponding to the intent meta-model, a composer meta-model corresponding to the one or more inference meta-models, and a set of abstract meta-models. These meta-models are defined based on the predefined ontology. The definition of the intent, inference, composer and abstract meta-models has been further described in detail below.

At 202, one or more intent meta-models are defined corresponding to at least one requirement and the predefined ontology. An intent meta-model represents an intent, which defines an objective that is considered to determine a sequence of planned actions to achieve a desired result. For example, for an enterprise process of hotel management, intent meta-models can be defined for providing home delivery services to consumers, providing menus online, and so forth. The intents are defined based on the requirements. For example, if a requirement corresponding to the hotel management system is to provide an online system for a meal ordering process, then the intents may include hosting a website for the meal ordering process, providing meal menus on the website, and so forth.

At 204, one or more inference meta-models are defined based on the intent meta-model and the predefined ontology. For example, the inference meta-models, such as a use case meta-model, a service interface meta-model, a business contract meta-model, a data model meta-model, a data entities meta-model, a security model meta-model, a service definition meta-model, a data definition meta-model, and an architecture model meta-model, may be defined based on the intent meta-model of a meal ordering process, as depicted in FIG. 3. An inference meta-model represents an inference derived directly or indirectly from an intent. For example, if the intent meta-model is a meta-model for a meal ordering process, then it may include concepts such as order delivery mode, payment mode, and so forth. Accordingly, the inference meta-models may be defined for the order delivery mode, the payment mode, and so forth.

As explained earlier, an inference meta-model can be directly defined from an intent meta-model. For example, if the intent meta-model is meta-model for a meal ordering process, then the inference meta-models for service interface, security, and so forth, may be directly defined from the intent meta-model. The inference meta-models that are directly defined from the intent meta-models are referred to as meta-models defined on the basis of simple inferences. Examples of meta-models based on simple inferences may include meta-models such as service interface meta-model, use case meta-model, business contract meta-model, security model meta-model, and so forth, as depicted in FIG. 3.

An inference meta-model can also be indirectly defined from the intent meta-model. For example, the meta-model for service definition can be inferred from service interface and business contract meta-models, which are simple inference meta-models defined for a meal ordering process. The inference meta-models that are defined indirectly from the intent meta-models are referred to as meta-models defined on the basis of composite inferences. Examples of meta-models defined based on composite inferences may include service definition, data definition, architectural model, and so forth, as depicted in FIG. 3.

At 206, a composer meta-model is defined for the one or more inference meta-models on the basis of the predefined ontology. The composer meta-model represents a composer defined on the basis of the predefined ontology. The composer meta-model connects the intent and inference meta-models to enable the automatic generation of software artifacts. For example, a composer meta-model, such as a factory definition meta-model, is defined to connect the intent meta-model for a meal ordering process and the corresponding inference meta-models, namely, the use case meta-model, the service interface meta-model, the business contract meta-model, the data model meta-model, the data entities meta-model, the security model meta-model, the service definition meta-model, the data definition meta-model, and the architecture model meta-model, as depicted in FIG. 3, for generating the software artifacts. The inference meta-models together with the intent meta-model provide a representation of the enterprise process. The intent meta-model and inference meta-models include various requirements for generating the software artifacts. However, these meta-models cannot be used to generate the software artifacts, since they are not interlinked. Therefore, they need to be interlinked to generate the software artifacts corresponding to the various requirements. In various embodiments of the invention, the user connects these meta-models based on their interdependency.

In a set of meta-models, each meta-model includes a reference to at least one other meta-model of the set of meta-models. In an embodiment of the invention, the meta-models including a reference to other meta-models are referred to as meta-models in a nested-reference mode. The composer meta-models hold references to all the one or more inference meta-models, which hold references to the corresponding intent meta-models. For example, the composer meta-model for factory definition holds a reference to the inference meta-models service definition, architecture model, and so forth, as depicted in FIG. 3.

At 208, a set of abstract meta-models is defined for defining intent meta-models, inference meta-models, and/or composer meta-models. In an embodiment of the invention, the set of abstract meta-models is inherited from a predefined set of abstract meta-models. The predefined set of abstract meta-models includes abstract meta-models that have been defined based on the requirements of various enterprise processes to help in the development of other meta-models such as intent, inference and composer meta-models. An abstract meta-model is a meta-model that can be inherited and/or overridden to define other meta-models. Abstract meta-models are based on the concept of abstraction that means a pattern where meta-models of similar nature can be generated from a base meta-model. For example, an abstract meta-model may be generated for the pricing of rooms in a hotel management system. Further, the abstract meta-model generated identifies a customer membership class, applicable taxes, approvals to exceptions such as discounts for premium customers and so forth. This abstract meta-model may be inherited and/or overridden to model the pricing of suites, when the hotel starts a new operation of renting out suites of 1-3 rooms. The abstract meta-model may also be extended by adding a few more elements to take care of the 1-3 rooms and other additional charges. This way we can reuse a meta-model instead of creating it every time.

At 210, the meta-model schema is built by connecting at least one set of meta-models to at least one other set of meta-models. For example, for a restaurant management system, sets of meta-models that have been defined for a meal ordering process, an order payment process, and an order delivery process may be connected to build the meta-model schema for the restaurant management system. In an embodiment of the invention, a meta-model schema can be built based on a single set of meta-models defined for the requirements corresponding to the enterprise process. In an embodiment of the invention, software generation tools use the meta-model schema to generate software artifacts. Examples of tools that use the meta-model schema to generate software artifacts include, but are not limited to, Microsoft's Domain Specific Language Toolkit©, Generic Modeling Environment by Vanderbilt University, and Metacase.

At 212, the completeness of the meta-model schema is calculated. The completeness of the meta-model schema is calculated on the basis of the total number of meta-models defined based on the one or more requirements.

In order to calculate the completeness of the meta-model schema, the number of intent meta-models that have been defined corresponding to the one or more requirements is determined. Thereafter, the number of inference meta-models that have been defined on the basis of the intent meta-models is determined. Subsequently, the number of composer meta-models that have been defined for the corresponding inference meta-models is determined. In addition, from the defined meta-models, the number of meta-models that include a reference to another meta-model of the one or more sets of meta-models is determined.

The completeness of the meta-model schema is calculated on the basis of the number of intent, inference, composer meta-models that have been defined based on the requirements, and the number of the number of meta-models that include a reference to another meta-model of the one or more sets of meta-models. The calculation of the completeness of the meta-model schema is described in detail in conjunction with FIG. 4.

FIG. 3 illustrates a set of meta-models 300, in accordance with an exemplary embodiment of the invention.

Set of meta-models 300 is defined to build software artifacts for a meal ordering process. The corresponding intent meta-model is the meta-model that has been defined for the meal ordering process.

The business and system requirements for building the application software are inferred and represented by the inference meta-models. The inference meta-models directly created from the intent are used to create composite inference meta-models. In this case, the use case meta-model, the service interface meta-model, the business contracts meta-model, the data model meta-model, the data entities meta-model and the security model meta-model are simple inference meta-models. Further, the service definition meta-model, the data definition meta-model, and the architecture model meta-model are composite inference meta-models defined based on the simple inference meta-models.

The intent meta-model and the corresponding inference meta-models that have been created for developing the application software for the meal ordering process are connected to the composer meta-model, namely, the factory definition meta-model. In another embodiment of the invention, set of meta-models 300 may represent a meta-model schema, when the intent, namely, the meal ordering process, is a single intent for an enterprise process.

Figure 4:
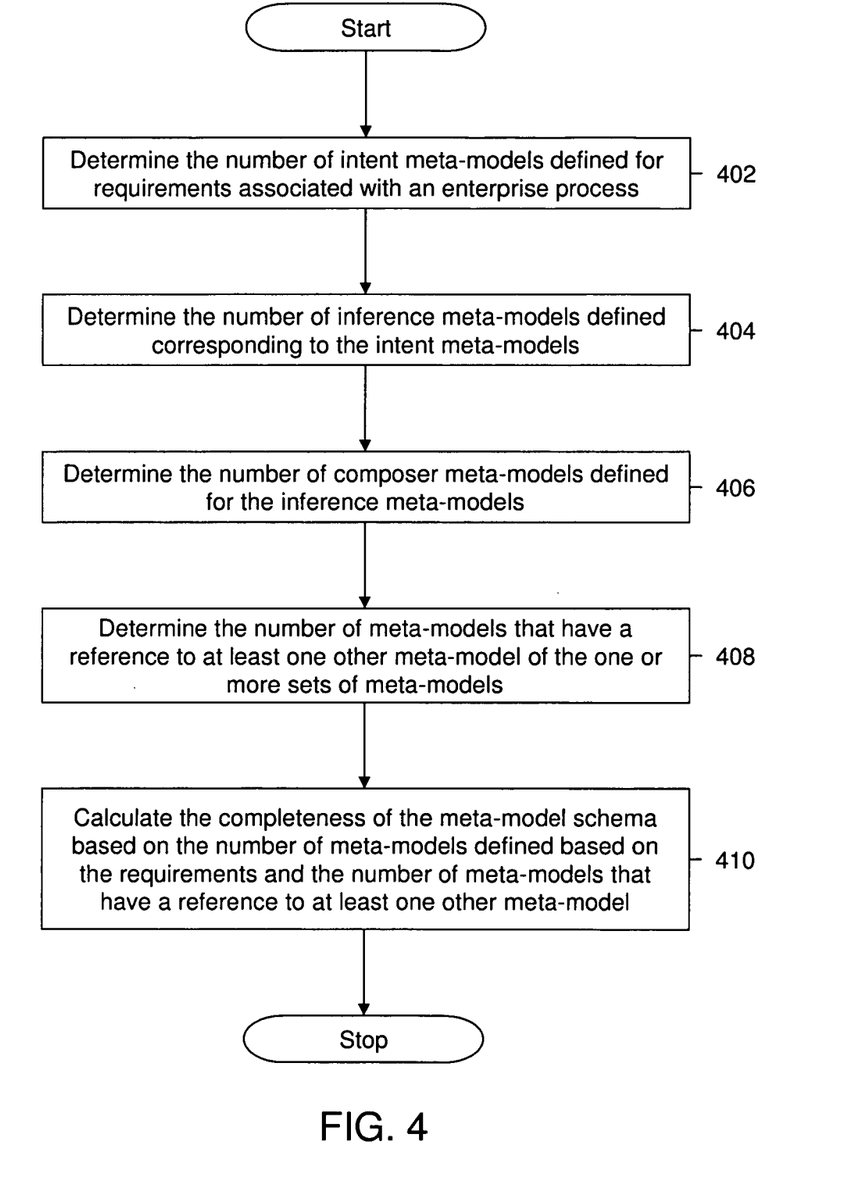
FIG. 4 illustrates a flowchart of a method for calculating the completeness of the meta-model schema, in accordance with an embodiment of the invention.

FIG. 4 illustrates a flowchart of a method for calculating the completeness of the meta-model schema, in accordance with an embodiment of the invention. To describe the method, references will be made to FIG. 1 and FIG. 2 and their description, although it should be understood that the method can be practiced with any other suitable embodiment of the invention, and can include fewer or greater number of steps than stated in FIG. 1 and FIG. 2.

The development of meta-model schema includes capturing one or more requirements associated with an enterprise process. Thereafter, these requirements are considered to define various sets of meta-models. The sets of meta-models are connected to define the meta-model schema. The development of the meta-model schema has been described in detail in conjunction with FIG. 1 and FIG. 2.

As described above, various meta-models are defined and connected to develop the meta-model schema. However, it may not be possible to consider all the requirements to define the meta-models. The requirements that are not quantifiable can not be considered to define the meta-models. The estimation of the completeness of the meta-model schema helps in determining the number of requirements that have been considered to define the meta-model schema as well as the application software. The estimation of the completeness of the meta-model schema has been described in detail below.

At 402, the number of intent meta-models that have been defined corresponding to the one or more requirements is determined. The requirements that are quantifiable are referred to as knowledge points. In an embodiment of the invention, the number of intent meta-models is determined by the user. For example, the user may determine that a total of 64 intent meta-models have been defined corresponding to 90 knowledge points. In another embodiment of the invention, a software algorithm is developed to determine the number of intent meta-models that have been defined corresponding to the one or more requirements.

At 404, the number of inference meta-models that have been defined corresponding to the intent meta-models is determined. This includes determining the number of intent meta-models from which inference meta-models have been defined. It may not be possible to define inference meta-models from all the intent meta-models. This may be due to various reasons related to costing of the project, pending decisions from upper management and so forth. In an embodiment of the invention, the number of inference meta-models is determined by the user. For example, the user may determine that 61 inference meta-models have been defined on the basis of 64 intent meta-models that have been defined corresponding to the one or more requirements. In addition, out of the 64 intent meta-models 57 are used to define the 61 inference meta-models. Further, the 61 inference meta-models may include meta-models defined on the basis of simple inferences as well as composite inferences. In another embodiment of the invention, the number of inference meta-models is determined by the software algorithm.

At 406, the number of composer meta-models that have been defined corresponding to the number of inference meta-models is determined. In an embodiment of the invention, the number of composer meta-models is determined by the user. For example, the user may determine that 12 composer meta-models have been defined from the 61 inference meta-models. In another embodiment of the invention, the number of composer meta-models is determined by the software algorithm.

At 408, the number of meta-models that hold a reference to other meta-models of the one or more sets of meta-models is determined. This is determined by determining the number of meta-models that do not hold a reference to other meta-models of the one or more sets of meta-models, the number of inference meta-models, and the number of composer meta-models. In an embodiment of the invention, the number of meta-models that hold a reference to other meta-models is determined by the user. For example, if the number of meta-models that do not hold a reference to other meta-models is 6, the number of inference meta-models is 61, and the number of composer meta-models is 12, then the number of meta-models that hold a reference to other meta-models is 67. In another embodiment of the invention, the number of meta-models that hold a reference to other meta-models is determined by the software algorithm.

At 410, the completeness of the meta-model schema is calculated. The completeness of the meta-model schema is calculated based on the number of intent meta-models defined for the one or more requirements, the number of inference meta-models defined corresponding to the defined intent meta-models, the number of composer meta-models defined corresponding to the defined inference meta-models, and the number of meta-models defined that hold a reference to other defined meta-models of the one or more sets of meta-models.

In accordance with an embodiment of the invention, the completeness of the meta-model schema is calculated based on:

$$SC=TC*INTC*INFC \quad (1)$$

Where, SC represents the schema completeness, TC represents turing completeness, INTC represents intent completeness, and INFC represents inference completeness.

TC is calculated based on the number of intent meta-models created from the captured knowledge points. TC is calculated based on:

$$TC=\text{Number of intent meta-models/Number of knowledge points} \quad (2)$$

Therefore, if 64 intent meta-models are created from 90 knowledge points, then TC is 0.71, in accordance with equation (2). The value of TC, in accordance with equation (2), represents that 71 percent of the knowledge points have been covered in the meta-model schema.

INTC is calculated based on the number of inferred intent meta-models and the total number of intent meta-models created from the captured knowledge points. The number of inferred intent meta-models represents the number of intent meta-models from which inference meta-models have been defined. INTC is calculated based on:

$$INTC=\text{Number of inferred intent meta-models/Total number of intent meta-models} \quad (3)$$

Therefore, if from 64 intent meta-models, 57 intent meta-models are used to define inference meta-models, then INTC is 0.89, in accordance with equation (3). The value of INTC, in accordance with equation (3), represents that 89 percent of the intents have been covered in the meta-model schema.

INFC is calculated based on the number of inference meta-models, the number of composer meta-models, and the number of meta-models without a reference to other meta-models of the one or more sets of meta-models. INFC is calculated based on:

$$INFC=\text{Number of inference meta-models+Number of composer meta-models Number of meta-models without a reference/Number of inference meta-models+Number of composer meta-models} \quad (4)$$

Therefore, if the number of inference meta-models is 61, the number of composer meta-models is 12, and the number of meta-models without a reference to other meta-models is 6, then INFC is 0.91, in accordance with equation (4).

Therefore, if TC is 0.71, INTC is 89 and INFC is 0.91, then SC is 0.57. The value of SC, in accordance with equation (1), represents that 57 percent of the requirements have been covered in the meta-model schema.

The calculation of the completeness of the meta-model schema enables the user to determine the number of requirements associated with the enterprise process that have been used to define the meta-model schema and in turn the application software.

Figure 5:
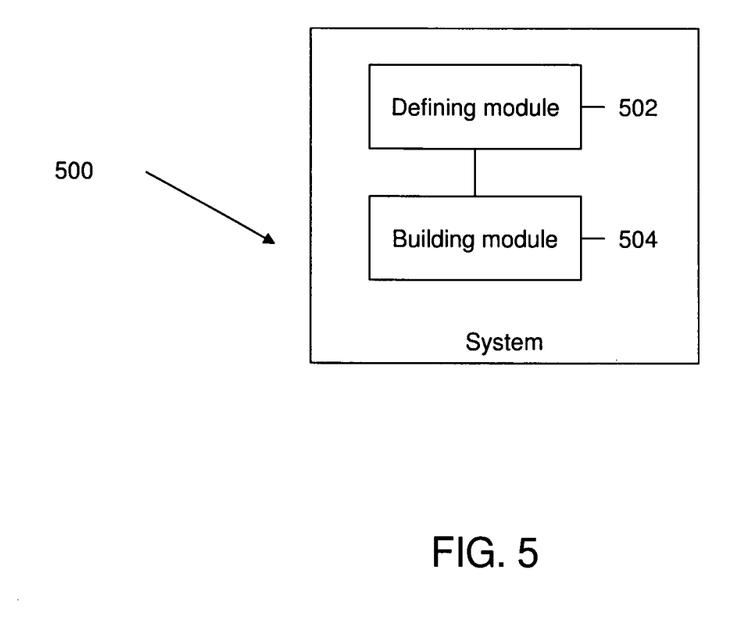
FIG. 5 illustrates a block diagram of a system for developing a meta-model schema, in accordance with an embodiment of the invention.

FIG. 5 illustrates a block diagram of a system 500 for developing a meta-model schema, in accordance with an embodiment of the invention. System 500 includes a defining module 502 and a building module 504. Defining module 502 enables a user to define one or more set of meta-models corresponding to one or more requirements. The user may be a software developer, an engagement/relationship manager, and the like. Building module 504 enables the user to connect one or more sets of meta-models.

Defining module 502 enables the user to define the one or more sets of meta-models based on the one or more requirements associated with the enterprise process. These requirements include, but are not limited to, business requirements and system requirements. The requirements that are associated with the enterprise process and the capturing of the requirements have been further described in conjunction with FIG. 1.

Defining module 502 also enables the user to define one or more intent meta-models based on at least one of the one or more requirements. Further, defining module 502 enables the user to define one or more inference meta-models corresponding to each intent meta-model. Furthermore, defining module 502 enables the user to define a composer meta-model for the one or more inference meta-models. Defining module 502 also enables the user to define a set of abstract meta-models for defining intent meta-models, inference meta-models, and/or composer meta-model. In an embodiment of the invention, the set of abstract meta-models is identified from a predefined set of abstract meta-models. The definition of the set of meta-models has been described in detail in conjunction with FIG. 2.

Building module 504 enables the user to build the meta-model schema by connecting at least one set of meta-models to at least one other set of meta-models. Building the meta-model schema has been described in detail in conjunction with FIG. 1 and FIG. 2.

Figure 6:
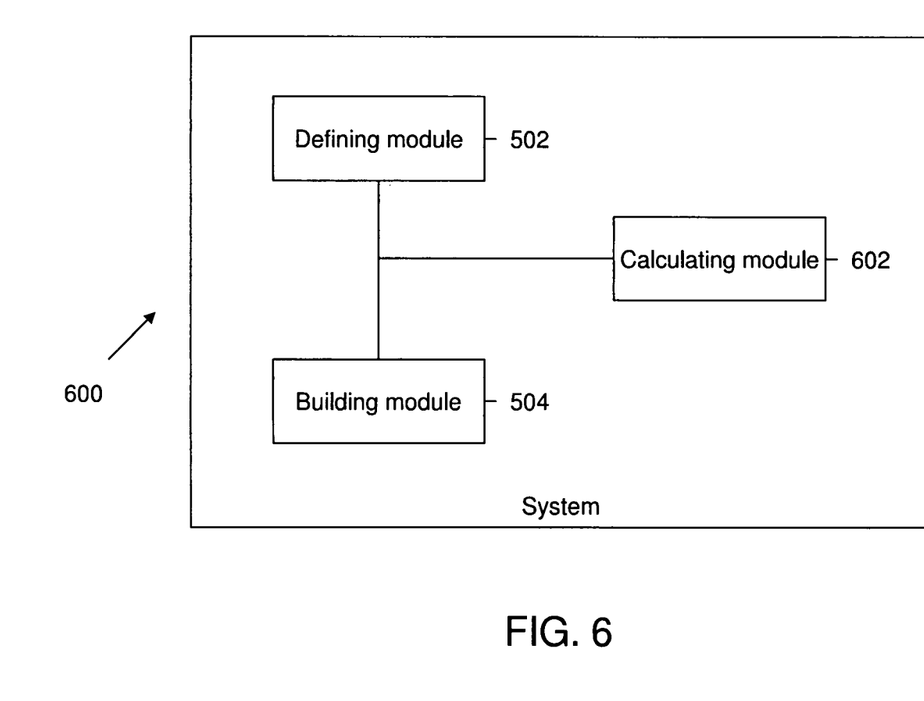
FIG. 6 illustrates a block diagram of the system for developing the meta-model schema, in accordance with another embodiment of the invention.

FIG. 6 illustrates a block diagram of a system 600 for developing the meta-model schema, in accordance with another embodiment of the invention. To describe system 600, references will be made to FIG. 5, although it should be understood that system 600 can be implemented with any other suitable embodiment of the invention. System 600 includes defining module 502, building module 504, and a calculating module 602. Defining module 502 enables a user to define one or more sets of meta-models based on one or more requirements associated with an enterprise process. Building module 504 enables the user to build the meta-model schema by connecting various sets of meta-models defined by defining module 502. Calculating module 602 calculates the completeness of the meta-model schema.

Defining module 502 enables the user to define the one or more sets of meta-models corresponding to the requirements. Defining module 502 has been described in detail in conjunction with FIG. 5. Building module 504 enables the user to build the meta-model schema by connecting at least one set of meta-models to at least one other set of meta-models. Building module 504 has been described in detail in conjunction with FIG. 5.

Calculating module 602 calculates the completeness of the meta-model schema based on the number of intent, inference, composer meta-models that have been defined based on the requirements, and the number of meta-models that hold a reference to other meta-models of the one or more sets of meta-models.

In an embodiment of the invention, the number of intent, inference, composer meta-models that have been defined based on the knowledge points, the number of intent meta-models that have been used to define the inference meta-models, and the number of meta-models that hold a reference to other meta-models of the one or more sets of meta-models are determined by a user. In another embodiment of the invention, the number of intent, inference, composer meta-models that have been defined based on the knowledge points, the number of intent meta-models that have been used to define the inference meta-models, and the number of meta-models that hold a reference to other meta-models of the one or more sets of meta-models are determined by a software algorithm.

In accordance with an embodiment of the invention, calculating module 602 determines the meta-model schema based on equation (1), (2), (3), and (4). The calculation of completeness of the meta-model schema has been described in detail in conjunction with FIG. 4.

The present invention enables a user to represent the enterprise process. The requirements associated with the enterprise process are captured and used to develop various sets of meta-models. Further, these meta-models are defined based on a predefined ontology. Therefore, the meta-model schema developed based on the meta-models includes a representation of meta-models that are interlinked. Further, the meta-model schema provides a distinct and differentiated representation of the enterprise process. In addition, each set of meta-models corresponds to at least one requirement. This enables the user to determine which meta-model has been defined for which requirement. Since the meta-models are defined based on the requirements, the software artifacts generated from these meta-models correspond to the requirements. Therefore, each software artifact generated using the meta-model schema corresponds to a task of the enterprise process. The present invention also enables the user to calculate the completeness of the meta-model schema. This helps the user to distinctly analyze the number of requirements that have been used to build the meta-model schema.

The system for developing a meta-model schema, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for developing the meta-model schema. The computer program product includes a computer usable medium having a set program instructions comprising a program code for developing the meta-model schema. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A method for developing a meta-model schema, the meta model schema being used for generating one or more software artifacts, the one or more software artifacts being generated for one or more requirements associated with an enterprise process, the method comprising:
   a. capturing the one or more requirements;
   b. defining a plurality of sets of meta-models, each of the sets of meta-models corresponding to at least one requirement and defined based on a predefined ontology, the predefined ontology comprising rules for defining and inter-relating meta-models, wherein at least one meta-model of a set of meta-models of the plurality of sets of meta-models is defined based on at least one other meta-model of the same set of meta-models, wherein each of the plurality of sets of meta-models comprises (i) one or more intent meta-models, each intent meta-model describing the corresponding requirement, wherein each intent meta-model is defined by a user, (ii) one or more inference meta-models for each intent meta-model, each inference meta-model describing business and technical requirements required for generating at least one software artifact of the one or more software artifacts, the business and technical requirements being determined based on the at least one requirement, each inference meta-model being defined by the user, (iii) a composer meta-model corresponding to the one or more inference meta-models, the composer meta-model defining the relation between the intent meta-model and the corresponding one or more inference meta-models, each composer meta-model being defined by the user, and (iv) a set of abstract meta-models, each abstract meta-model of the set of abstract meta-models being inherited from a predefined set of abstract meta-models while defining at least one of the one or more intent meta-models, at least one of the one or more inference meta-models and at least one composer meta-model
   c. building the meta-model schema by connecting at least one set of meta-models from among the plurality of sets of meta-models to at least one other set of meta-models from among the plurality of sets of meta-models, the connection being based on relations between the corresponding requirements: and
   d. calculating a completeness of the meta-model schema, the completeness of the meta-model schema being a function of: (i) a number of intent meta-models defined for the one or more requirements, (ii) a number of inference meta-models defined for each intent meta-model, (iii) a number of composer meta-models defined corresponding to the inference meta-models, and (iv) a number of meta-models of the one or more sets of meta-models that have a reference to at least one other meta-model of the set of meta-models, each reference being defined by the user,
   wherein the completeness of the meta-model schema is additionally a function of a number of quantifiable requirements among the one or more requirements, and
   wherein the completeness of the meta-model schema is calculated according to the following formula:
   $SC = (Na/Nb)*(Nc/Nd)*((Ne+Nf-Ng)/(Ne+Nf))$, wherein SC is the completeness of the meta-model schema, Na is a number of intent meta-models, Nb is the number of quantifiable requirements, Nc is a number of intent meta-models from which inference meta-models have been defined, Nd is a total number of intent meta-models, Ne is a number of inference meta-models, Nf is a number of composer meta-models, and Ng is a number of meta-models without a reference to other meta-models.

2. The method of claim 1, wherein the one or more requirements are captured by a user.

3. The method of claim 1, wherein the at least one meta-model of the set of meta-models is defined based on the at least one other meta-model of the set of meta-models by a user.

4. The method of claim 1, wherein the sets of meta-models are connected by a user.

5. The method of claim 1, wherein each software artifact of the one or more software artifacts corresponds to each set of meta-models.

6. The method of claim 1, wherein defining each of the one or more sets of meta-models comprises defining one or more intent meta-models corresponding to the at least one requirement, each intent meta-model describing the corresponding at least one requirement.

7. The method of claim 6, wherein defining the set of meta-models comprises defining one or more inference meta-models corresponding to each defined intent meta-model, each inference meta-model describing business and technical requirements required for generating at least one software artifact of the one or more software artifacts, the business and technical requirements being determined based on the at least one requirement.

8. The method of claim 7, wherein defining each set of meta-models comprises defining a composer meta-model corresponding to the one or more inference meta-models, each composer meta-model defining the relation between the intent meta-model and the corresponding one or more inference meta-models.

9. The method of claim 8, wherein defining each set of meta-models comprises defining a set of abstract meta-models, each abstract meta-model of the set of abstract meta-models being inherited from a predefined set of abstract meta-models while defining at least one of the one or more intent meta-models, at least one of the one or more inference meta-models and at least one composer meta-model.

10. A system for developing a meta-model schema, the meta-model schema being developed for generating one or more software artifacts, the one or more software artifacts being generated for one or more requirements associated with an enterprise process, the system comprising:
   a. a microprocessor;
   b. a defining module, the defining module configured for enabling a user to define a plurality of sets of meta-models, each of the sets of meta-models corresponding to at least one requirement and defined based on a predefined ontology, the predefined ontology comprising rules for defining and inter-relating meta-models, and at least one meta-model of a set of meta-models of the plurality of sets of meta-models being defined based on at least one other meta-model of the same set of meta-models, wherein each of the plurality of sets of meta-models comprises (i) one or more intent meta-models, each intent meta-model describing the corresponding requirement, wherein each intent meta-model is defined by a user, (ii) one or more inference meta-models for each intent meta-model, each inference meta-model describing business and technical requirements required for generating at least one software artifact of the one or more software artifacts, the business and technical requirements being determined based on the at least one requirement, each inference meta-model being defined by the user, (iii) a composer meta-model corresponding to the one or more inference meta-models, the composer meta-model defining the relation between the intent meta-model and the corresponding one or more inference meta-models, each composer meta-model being defined by the user, and (iv) a set of abstract meta-models, each abstract meta-model of the set of abstract meta-models being inherited from a predefined set of abstract meta-models while defining at least one of the one or more intent meta-models, at least one of the one or more inference meta-models and at least one composer meta-model;

c. a building module, the building module configured for enabling the user to build the meta-model schema by connecting at least one set of meta-models from among the plurality of sets of meta-models to at least one other set of meta-models from among the plurality of sets of meta-models, the connection being based on the relation between the corresponding requirements; and d. calculating a completeness of the meta-model schema, the completeness of the meta-model schema being a function of: (i) a number of intent meta-models defined for the one or more requirements, (ii) a number of inference meta-models defined for each intent meta-model, (iii) a number of composer meta-models defined corresponding to the inference meta-models, and (iv) a number of meta-models of the one or more sets of meta-models that have a reference to at least one other meta-model of the set of meta-models, each reference being defined by the user, wherein the completeness of the meta-model schema is additionally a function of a number of quantifiable requirements among the one or more requirements, and wherein the completeness of the meta-model schema is calculated according to the following formula:

$SC=(Na/Nb)*(Nc/Nd)*((Ne+Nf-Ng)/(Ne+Nf))$, wherein SC is the completeness of the meta-model schema, Na is a number of intent meta-models, Nb is the number of quantifiable requirements, Nc is a number of intent meta-models from which inference meta-models have been defined, Nd is a total number of intent meta-models, Ne is a number of inference meta-models, Nf is a number of composer meta-models, and Ng is a number of meta-models without a reference to other meta-models.

11. The system of claim 10, wherein the one or more requirements are captured by the user.

12. The system of claim 10, wherein the at least one meta-model of the set of meta-models is defined based on the at least one other meta-model by the user.

13. The system of claim 10, wherein each software artifact of the one or more software artifacts corresponds to each set of meta-models.

14. The system of claim 10, wherein the sets of meta-models are connected by the user.

15. The system of claim 10, wherein the defining module is further configured for defining one or more intent meta-models corresponding to the at least one requirement, each intent meta-model describing the corresponding at least one requirement.

16. The system of claim 15, wherein the defining module is further configured for defining one or more inference meta-models corresponding to each defined intent meta-model, each inference meta-model describing business and technical requirements required for generating at least one software artifact of the one or more software artifacts, the business and technical requirements being determined based on the at least one requirement.

17. The system of claim 16, wherein the defining module is further configured for defining a composer meta-model corresponding to the one or more inference meta-models, each composer meta-model defining the relation between the intent meta-model and the corresponding one or more inference meta-models.

18. The system of claim 17, wherein the defining module is further configured for defining a set of abstract meta-models, each abstract meta-model of the set of abstract meta-models being inherited from a predefined set of abstract meta-models while defining at least one of the one or more intent meta-models, at least one of the one or more inference meta-models and at least one composer model.

19. A computer program product for use with a stored program computer, the computer program product comprising a non-transitory computer usable medium having a computer readable program code embodied therein for generating one or more software artifacts, the one or more software artifacts being generated for one or more requirements associated with an enterprise process, the computer readable program code comprising instructions for:

a. capturing the one or more requirements;

b. enabling a user to define a plurality of sets of meta-models, each of the sets of meta-models corresponding to at least one requirement and defined based on a predefined ontology, the predefined ontology comprising rules for defining and inter-relating meta models, and wherein at least one meta-model of a set of meta-models of the plurality of sets of meta-models being defined based on at least one other meta-model of the same set of meta-models, wherein each of the plurality of sets of meta-models comprises (i) one or more intent meta-models, each intent meta-model describing the corresponding requirement, wherein each intent meta-model is defined by a user, (ii) one or more inference meta-models for each intent meta-model, each inference meta-model describing business and technical requirements required for generating at least one software artifact of the one or more software artifacts, the business and technical requirements being determined based on the at least one requirement, each inference meta-model being defined by the user, (iii) a composer meta-model corresponding to the one or more inference meta-models, the composer meta-model defining the relation between the intent meta-model and the corresponding one or more inference meta-models, each composer meta-model being defined by the user, and (iv) a set of abstract meta-models, each abstract meta-model of the set of abstract meta-models being inherited from a predefined set of abstract meta-models while defining at least one of the one or more intent meta-models, at least one of the one or more inference meta-models and at least one composer meta-model c. enabling the user to build the meta-model schema by connecting at least one set of meta-models from among the plurality of sets of meta-models to at least one other set of meta-models from among the plurality of sets of meta-models, the connection being based on relations between the corresponding requirements; and d. calculating a completeness of the meta-model schema, the completeness of the meta-model schema being a function of: (i) a number of intent meta-models defined for the one or more requirements, (ii) a number of inference meta-models defined for each intent meta-model, (iii) a number of composer meta-models defined corresponding to the inference meta-models, and (iv) a number of meta-models of the one or more sets of meta-models that have a reference to at least one other meta-model of the set of meta-models, each reference being defined by the user, wherein the completeness of the meta-model schema is additionally a function of a number of quantifiable requirements among the one or more requirements, and wherein the completeness of the meta-model schema is calculated according to the following formula:

$SC=(Na/Nb)*(Nc/Nd)*((Ne+Nf-Ng)/(Ne+Nf))$, wherein SC is the completeness of the meta-model schema, Na is a number of intent meta-models, Nb is the number of quantifiable requirements, Nc is a number of intent meta-models from which inference meta-models have been defined, Nd is a total number of intent meta-models, Ne is a number of inference meta-models, Nf is a number of composer meta-models, and Ng is a number of meta-models without a reference to other meta-models.

20. The computer program product of claim 19, wherein the one or more requirements are captured by the user.

21. The computer program product of claim 19, wherein the at least one meta-model of the set of meta-models being defined based on the at least one other meta-model by the user.

22. The computer program product of claim 19, wherein the sets of meta-models are connected by the user.

23. The computer program product of claim 19, wherein each software artifact of the one or more software artifacts corresponds to each set of meta-models.

24. The computer program product of claim 19, wherein defining each set of meta-models the computer readable program code further performs defining one or more intent meta-models corresponding to the at least one requirement, each intent meta-model describing the corresponding at least one requirement.

25. The computer program product of claim 24, wherein defining each set of meta-models the computer readable program code further performs defining one or more inference meta-models corresponding to each defined intent meta-model, each inference meta-model describing business and technical requirements required for generating at least one software artifact of the one or more software artifacts, the business and technical requirements being determined based on the at least one requirement.

26. The computer program product of claim 25, wherein defining each set of meta-models the computer readable program code further performs defining a composer meta-model corresponding to the one or more inference meta-models, each composer meta-model defining the relation between the intent meta-model and the corresponding one or more inference meta-models.

27. The computer program product of claim 26, wherein defining each set of meta-models the computer readable program code further performs defining a set of abstract meta-models, each abstract meta-model of the set of abstract meta-models being inherited from a predefined set of meta-models while defining at least one of the one or more intent meta-models, at least one of the one or more intent meta-models, at least one of the one or more inference meta-models and at least one composer meta-models.

\* \* \* \* \*